United States Patent [19]

Nagata et al.

[11] Patent Number: 4,873,208
[45] Date of Patent: Oct. 10, 1989

[54] HOLDER FOR SEALING MEMBER

[75] Inventors: Mitsuhiro Nagata, Yokohama; Tadashi Hayashi, Yokosuka; Yoshinobu Hashimoto, Sakai; Kiyoshi Nakamura, Yokohama, all of Japan

[73] Assignee: Kabushiki Kaisha Toshiba, Kawasaki, Japan

[21] Appl. No.: 109,399

[22] Filed: Oct. 19, 1987

Related U.S. Application Data

[63] Continuation of Ser. No. 849,728, Apr. 9, 1986, abandoned.

[30] Foreign Application Priority Data

Jun. 10, 1985 [JP] Japan ................. 60-124221

[51] Int. Cl.$^4$ .................. C04B 35/52; C04B 35/58
[52] U.S. Cl. ........................... 501/89; 501/92; 269/908; 294/99.1; 294/99.2; 445/43; 445/44; 445/45
[58] Field of Search ............ 501/89, 92; 269/319, 269/908, 6, 902, 903; 294/99.1, 99.2; 445/43, 44, 45; 65/34, 36, 59.1, 59.4, 154, 374.13

[56] References Cited

U.S. PATENT DOCUMENTS

| | | | |
|---|---|---|---|
| 2,865,240 | 12/1958 | Kniser | 269/6 |
| 3,441,706 | 4/1969 | Van Steven | 219/10.75 |
| 3,494,756 | 3/1970 | Damm | 65/154 |
| 3,589,001 | 6/1971 | Van Steven | 29/602.1 |
| 4,314,394 | 2/1982 | Armstrong | 445/44 |

FOREIGN PATENT DOCUMENTS

| | | | |
|---|---|---|---|
| 0064279 | 4/1983 | Japan | 501/92 |
| 0064280 | 4/1983 | Japan | 501/89 |
| 0084914 | 5/1983 | Japan | 501/89 |
| 0140374 | 8/1983 | Japan | 501/89 |
| 0039775 | 3/1984 | Japan | 501/89 |
| 0112670 | 6/1985 | Japan | 501/89 |
| 1186955 | 4/1970 | United Kingdom | 65/154 |

Primary Examiner—William R. Dixon, Jr.
Assistant Examiner—James M. Hunter, Jr.
Attorney, Agent, or Firm—Foley & Lardner, Schwartz, Jeffery, Schwaab, Mack, Blumenthal & Evans

[57] ABSTRACT

Disclosed is a holder for sealing member, in which at least a portion of the holder which comes into contact with the member comprises a sintered body comprising as a main component a non-oxide ceramic of silicon nitride, aluminum nitride, sialon or silicon carbide.

By the use of the holder according to this invention, in the hermetic sealing process which is carried out continuously and automatically, an exchange frequency of the holder can be decreased remarkably, and thus a working efficiency on a manufacturing line can be increased. In consequence, the holder according to this invention is industrially very useful, and in particular, it is suitable for the hermetic sealing of the panel pins for cathode ray tubes.

10 Claims, 2 Drawing Sheets

HOLDER FOR SEALING MEMBER

This is a continuation of application Ser. No. 849,728 filed April 9, 1986 now abandoned.

BACKGROUND OF THE INVENTION

This invention relates to a holder used at the time when a sealing member is hermetically sealed in a glass article, specifically, squeezed into a softened glass article. More specifically, it relates to a holder suitable for the hermetical sealing of panel pins in cathode ray tubes.

The hermetic sealing of sealing members being constituted of various sealing alloys to glass articles is carried out by planting the members in thermally softened portions of the glass articles, and at this time, a holder is used to squeeze the members into the glass articles.

For example, in a manufacturing process for the cathode ray tubes, there is a step of hermetically sealing by planting the panel pins for supporting a shadow mask at four positions on the inner wall of the edge portion of a panel face. One cycle of this step is usually composed of softening a panel glass by heating the panel face in the atmosphere, and planting the panel pins each having a predetermined size in the softened portions of the panel glass in a certain period of time by the use of the holder.

Such a conventional technique is disclosed in, for example, Japanese Patent Publication No. 24291/1973 (which corresponds to U.S. Pat. Nos. 3,441,706 and 3,589,001). In this technical concept, the holder made from aluminum oxide is described.

In general, the used panel pin is made from a material such as a 42% Ni-6% Cr-Fe alloy, and the holder is manufactured from a sintered alumina.

However, such an alumina holder has the following problems, and its lifetime is very short, with the result that the hermetic sealing step of the panel pins cannot be operated continuously for a long time.

That is, the above mentioned problems of the conventional holder are as follows: (1) since the hermetic sealing operation is carried out in the atmosphere, the surface of the panel pin will be oxidized, and the formed oxide (mainly chromium oxide) will meltingly adhere to the portion of the holder brought into contact with the panel pin and/or a vaporized substance from the oxide will deposit on the above portion of the holder, which fact will prevent the panel pins from being planted in accordance with a severe design criterion. Further, (2) the conventional alumina holder has a wettability to the oxide film of the panel pin and the panel glass at a high temperature, and thus the oxide film of the panel pin and the melted panel glass tend to adhere to the tip portion of the holder at hermetic sealing operation. Furthermore, (3) when the panel pin is planted, a great frictional force will occur between the head portion of the panel pin and the tip contact portion of the holder, and the friction of these portions will make progress with time, so that a mounting accuracy will finally deviate from the design criterion. Moreover, (4) in the hermetic sealing operation, a step of heating up to a temperature of several hundred to about 1,100° C. and a subsequent step of being allowed to cool are repeated in one cycle of 30 to 60 seconds, and hence it is important that the holder is excellent in thermal shock resistance in addition to heat resistance, and that its wettability is small. In view of these points, the conventional alumina holder is not always satisfactory.

For these reasons, there is strongly desired an improvement in the holder made from a novel material which enables a lifetime to be prolonged and the panel pins to be hermetically sealed continuously for a long time.

SUMMARY OF THE INVENTION

An object of this invention is to provide a novel holder for sealing member, especially, for panel pins of cathode ray tubes, capable of solving the above mentioned problems which the conventional alumina holder has.

With the intention of achieving the above mentioned object, the present inventors have intensively researched on materials which permit overcoming the above recited problems which the conventional alumina holder has. As a result, it has been found that a sintered body containing, as a main component, a non-oxide ceramic of silicon nitride, aluminum nitride, sialon, silicon carbide or the like, which will be described hereinafter, is a suitable and effective material, and the holder according to this invention has been developed on the basis of such a knowledge.

That is, a holder for sealing member according to this invention is characterized in that at least a portion of the holder which will come into contact with the sealing member comprises a sintered body (hereinafter referred to as the non-oxide ceramic) containing, as a main component, a non-oxide ceramic of silicon nitride, aluminum nitride, sialon or silicon carbide.

DESCRIPTION OF PREFERRED EMBODIMENT

Figure 1:
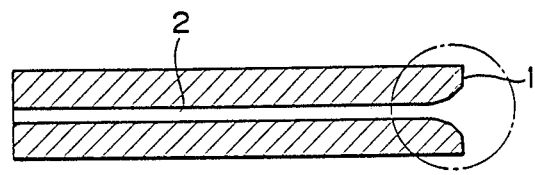
FIG. 1 is a vertical section of a holder for panel pins according to this invention.

A holder of this invention may be composed of the non-oxide ceramic all over, but a portion of the holder which comes into contact with the sealing members in glass articles, i.e., a portion at which specific properties are required may merely be made from the non-oxide ceramic sintered body, and the other portion of the holder, for example, the portion grasped by a holder driving mechanism may be made from a usual heat-resistant metal or alloy. In the latter case, both the portions may be associated integrally by the use of a means such as shrink fitting, screw fixing or melt joining, and this constitution is industrially advantageous, because of a low cost.

As the non-oxide ceramics of this invention, silicon nitride, aluminum nitride, sialon and silicon carbide are effective. Of these compounds, silicon nitride is excellent in abrasion resistance and thermal shock resistance, and aluminum nitride is excellent in heat conductivity. Sialon is an Si-Al-O-N series compound (see Nature Physical Science, Vol. 238, No. 80, pp. 28-29, July 10, 1972) and having the substantially same characteristics as silicon nitride. Silicon carbide has a feature of small deterioration of strength at high temperature. For the use of the sintered body at high temperature, silicon series non-oxide ceramics of silicon nitride, sialon or silicon carbide is preferred. Further, for the use requiring an excellent abrasion resistance, silicon nitride or sialon is preferred.

The sintered body made from silicon nitride usually contains a sintering auxiliary, for example, for obtaining strength at high temperature, oxides of rare earth element such as yttrium oxide ($Y_2O_3$) in the amount of not more than 10 % by weight, preferably, further aluminum oxide ($Al_2O_3$), manganese monoxide (MgO), aluminum nitride (AlN) and the like in the amount of not more than 10 % by weight, respectively. For further enhancement of sinterability, $ZrO_2$ is also effective.

The sintered body made from aluminum nitride also contains a sintering auxiliary, for example, for enhancement of heat conductivity, oxides of rare earth element such as $Y_2O_3$ in the amount of not more than 10% by weight, preferably, further calcium, strontium, barium and the like in the amount of not more than 10% by weight, respectively.

As for the sintered body made from sialon, the same sintering auxiliary as for silicon nitride i effective.

For the sintered body made from silicon carbide, an addition of 5% by weight or less of boron or carbon is effective for enhancement of sinterability, and 5% by weight or less of aluminum compound is also effective.

Hereinafter, preferred composition with regard to silicon nitride is described specifically.

That is, the sintered body comprising 0.05 to 5% by weight of $Al_2O_3$, 0.05 to 6% by weight of AlN, 0.1 to 7% by weight of $Y_2O_3$ and the balance consisting essentially of silicon nitride $Si_3N_4$ is preferred, because, on the tip portion of the holder which is brought into contact with the panel pins, a deposition of a vaporized substance from the panel pins is particularly small. In this sintered body, AlN behaves as a sintering auxiliary.

Now, one example for preparing such a sintered body will be described. In the first place, 3% by weight of $Al_2O_3$, 3% by weight of AlN, 5% by weight of $Y_2O_3$ and the balance substantially consisting of $Si_3N_4$ which have been manufactured in a usual manner and all of which have an average grain diameter of about 1.5 $\mu$m are mixed with one another, the stirring is continued for about 100 hours so that a grain diameter of the resulting mixture may be within the range of 0.1 to 2.0 $\mu$m. Afterward, 5% based on the weight of resulting mixture of a wax series binder is added thereto, followed by stirring so that a grain diameter of the mixture may be about 100 $\mu$m. Then, press molding is carried out at a press pressure of about 1,000 kg/cm$^2$. The molded product is then sintered at a temperature of 1,700° to 1,800° C. for 0.5 to 6 hours in a nitrogen atmosphere under ordinary pressure, and is finished by grinding it.

A sintering treatment in this invention may be carried out by hot press, ordinary pressure sintering, gas pressure sintering and HIP, and a sintering temperature in such a treatment is within the range of 1,700° to 2,000° C.

The suitable sintered body of this invention has a Vickers' hardness of 1,300 to 1,800, preferably more than 1,500, and a density of more than 95%.

In the suitable holder of this invention, the surface of its top portion which will come into contact with the panel pins is finished to a grinding degree of less than 4 S, preferably 0.5 to 4 S. If a roughness on the surface of the contact portion exceeds 4 S, an oxide on the surfaces of the panel pins will be liable to deposit on this contact portion in large quantities. While if the roughness is less than 0.5 S, difficulty raises in workability. The unit "S" mentioned above represents a roughness on the contact surface in accordance with JIS (Japanese Industrial Standard) B0601, and 1 S is equal to 4/1.1 RMS (American Standard Surface Finish Measurement).

There are also contained, as impurities, $Fe_2O_3$, CaO, $MnO_2$ and the like.

It is to be noted that the addition of $TiO_2$ will increase a wettability of the sintered body and is not advantageous.

Now, this invention will be described in detail in reference to examples but should not be limited by these examples.

EXAMPLE 1

An $Al_2O_3$ powder, an AlN powder, a $Y_2O_3$ powder and an $Si_3N_4$ powder were mixed with one another in a ratio of 3% by weight, 3% by weight, 3% by weight, respectively, and with the balance of $Si_3N_4$. Molding and sintering were then carried out to prepare a cylindrical article, and the latter is afterward finished on the surface thereof. The thus manufactured holder for panel pins is shown in FIG. 1.

Figure 2:
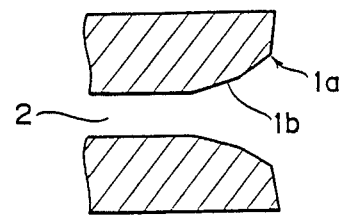
FIG. 2 is an enlarged view of a circular portion in FIG. 1.
Figure 3:
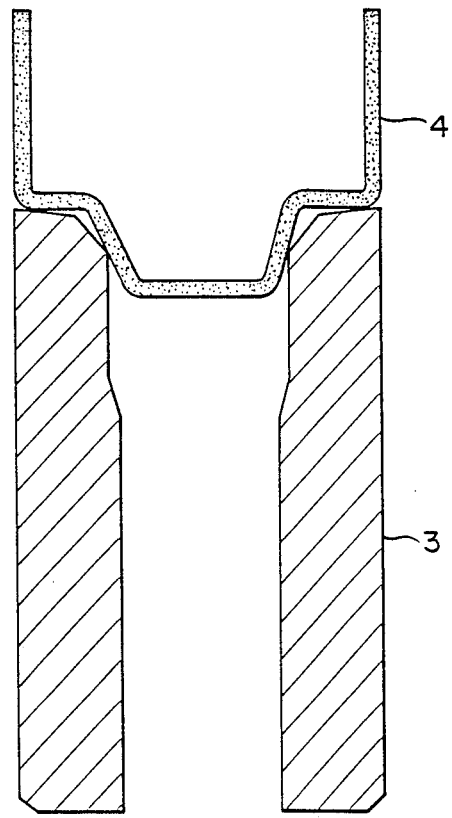
FIG. 3 shows one embodiment in which a holder holds a panel pin.

In FIG. 1, reference numeral 1 is a portion of the holder which will come into contact with the panel pins, and this portion (in the circle in FIG. 1) is exhibited in an enlarged view of FIG. 2. In FIG. 2, numeral 1a and 1b are called "an overall height portion" and "an inner diameter portion", respectively, and these portions will brought into contact with the head portion of each panel pin. In this example, these portions were ground up to a level of 1 S. Numeral 2 is a central hole which is provided to suck and hold each panel pin brought into contact with the contact portion 1. The contact portions 1 may be provided on opposite ends of the holder, and in such a constitution, when one of the contact portions has been worn, the other can be used subsequently. FIG. 3 illustrates one embodiment in which a panel pin 4 is held by a holder 3.

This holder was then attached to a hermetic sealing device for the panel pins each comprising a 42% Ni-6% Cr-Fe alloy and the device was driven.

After certain cycles, padding states on the overall height portion and the inner diameter portion, damage state due to thermal shock and their lifetime were observed. The results are set forth in a table.

EXAMPLES 2 to 4

Sintered bodies in which balances were composed substantially of AlN, sialon and SiC were prepared in Example 2, 3 and 4, respectively, in the same manner as in Example 1, and similar tests were carried out. The results are set forth in the table.

Comparative Example 1

For comparison, the same tests as in the above examples were carried out for a holder comprising a conventional alumina sintered body. The results are set forth together in the table. This conventional alumina sintered body had the following usual composition:

| | |
|---|---|
| $Al_2O_3$ | 90 to 92% by weight |
| $SiO_2$ | 4 to 5% by weight |
| MgO | 2 to 3% by weight |
| $Cr_2O_3$ | 0.5 to 1% by weight |
| CaO | less than 0.5% by weight |
| $Fe_2O_3$ | less than 0.3% by weight |

TABLE

|  | Damage (%) | Lifetime (day) | Padding state Thickness of deposition on overall height portion (mm) | Padding state Thickness of deposition on ineer diameter portion (mm) | Total evaluation |
| --- | --- | --- | --- | --- | --- |
| Example 1 | 0 | 30 | 0.025 | 0.02 | best |
| Example 2 | 2 | 15 | 0.15 | 0.12 | good |
| Example 3 | 0.3 | 20 | 0.15 | 0.10 | better |
| Example 4 | 0 | 12 | 0.15 | 0.10 | good |
| Comparative example | 5 | 3 | 0.30 | 0.15 | medial |

Note: The lifetime is a number of day in which the holder may be operable under the continuous operation of about 2,000 times with 40-seconds cycle a day.

As is apparent from the above results, the holder according to this invention has a high resistance to thermal shock and a less wettability to the oxides on the surfaces of the panel pins, and thus any padding is not perceived on the overall height portion and the inner diameter portion of the holder, whereby a size accuracy of the initial design criterion of the holder can be maintained for a long period of time. Therefore, in the hermetic sealing process which is carried out continuously and automatically, an exchange frequency of the holder can be decreased remarkably, and thus a working efficiency on a manufacturing line can be increased. In consequence, the holder according to this invention is industrially very useful, and in particular, it is suitable for the hermetic sealing of the panel pins for cathode ray tubes.

We claim:

1. A holder for a sealing member, in which at least a portion of said holder which comes into contact with said member comprises a sintered body comprising as a main component a non-oxide ceramic of silicon nitride, aluminum nitride, sialon or silicon carbide finished to a grinding degree of less that 4 S wherein S indicates a surface roughness in accordance with Japanese Industrial Standard B 0601.

2. The holder for sealing member according to claim 1, wherein said sintered body comprises not more than 10% by weight of an oxide of a rare earth element and the balance consisting essentially of said silicon nitride.

3. The holder for sealing member according to claim 2, wherein said sintered body further comprises not more than 10% by weight of aluminum oxide, not more than 10% by weight of manganese monoxide and not more than 10% by weight of aluminum nitride.

4. The holder for sealing member according to claim 1, wherein said sintered body comprises 0.05 to 5% by weight of aluminum oxide, 0.05 to 6% by weight of aluminum nitride, 0.1 to 7% by weight of yttrium oxide and the balance consisting essentially of said silicon nitride.

5. The holder for sealing member according to claim 1, wherein said sintered body comprises not more than 10% by weight of an oxide of a rare earth element and the balance consisting essentially of said aluminum nitride.

6. The holder for sealing member according to claim 5, wherein said sintered body further comprises not more than 10% by weight of calcium, not more than 10%/by weight of strontium and not more than 10% by weight of barium.

7. The holder for sealing member according to claim 1, wherein said sintered body comprises not more than 10% by weight of an oxide of a rare earth element and the balance consisting essentially of said sialon.

8. The holder for sealing member according to claim 7, wherein said sintered body further comprises not more than 10% by weight of aluminum nitride, not more than 10% by weight of manganese monoxide and not more than 10% by weight of aluminum nitride.

9. The holder for sealing member according to claim 1, wherein said sintered body comprises at least one of 5% by weight or less of boron, 5% by weight or less of carbon and 5% by weight or less of aluminum compound and the balance consisting essentially of said silicon carbide.

10. The holder for sealing member according to claim 1, wherein said sealing member is a pin for cathode ray tube.

* * * * *